(12) United States Patent
Collins et al.

(10) Patent No.: US 10,941,337 B2
(45) Date of Patent: Mar. 9, 2021

(54) FIBER CONFIGURATIONS FOR WELLBORE TREATMENT COMPOSITIONS

(71) Applicant: Eastman Chemical Company, Kingsport, TN (US)

(72) Inventors: Nick Allen Collins, Fall Branch, TN (US); S M Bedarul Islam, Kingsport, TN (US); Phillip Michael Cook, Kingsport, TN (US); Koushik Ghosh, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 16/340,210

(22) PCT Filed: Oct. 11, 2017

(86) PCT No.: PCT/US2017/056187
§ 371 (c)(1),
(2) Date: Apr. 8, 2019

(87) PCT Pub. No.: WO2018/071571
PCT Pub. Date: Apr. 19, 2018

(65) Prior Publication Data
US 2020/0040254 A1 Feb. 6, 2020

Related U.S. Application Data

(60) Provisional application No. 62/406,757, filed on Oct. 11, 2016.

(51) Int. Cl.
*C09K 8/90* (2006.01)
*C09K 8/80* (2006.01)
*C09K 8/92* (2006.01)

(52) U.S. Cl.
CPC .................. *C09K 8/90* (2013.01); *C09K 8/80* (2013.01); *C09K 8/92* (2013.01); *C09K 2208/08* (2013.01)

(58) Field of Classification Search
None
See application file for complete search history.

(56) References Cited

U.S. PATENT DOCUMENTS 6,177,194 B1   1/2001   Koppe
7,267,170 B2   9/2007   Mang et al.
(Continued)

FOREIGN PATENT DOCUMENTS

WO   WO 2011-128172 A1   10/2011

OTHER PUBLICATIONS

Notification of Transmittal of the International Search Report and the Written Opinion of the International Searching Authority, or the Declaration: International Application No. PCT/US2017/056187 dated May 29, 2018.

(Continued)

*Primary Examiner* — Jeffrey D Washville
(74) *Attorney, Agent, or Firm* — Kenrick L. Vidale (57) ABSTRACT

Suspension of proppants in hydraulic fracturing applications can be strongly affected by the cross-sectional shapes and lengths of the fibers present in the wellbore treatment compositions. For instance, it has been observed that crimped cellulose ester fibers with a trilobal cross-section and an optimized length can provide enhanced suspension of proppants in aqueous fracturing fluids. Furthermore, the present invention demonstrates that non-round cellulose ester fibers can provide superior proppant suspension properties relative to polylactic acid fibers with a round cross-section.

6 Claims, 8 Drawing Sheets

(56) References Cited

U.S. PATENT DOCUMENTS

| | | | |
|---|---|---|---|
| 7,275,596 | B2 | 10/2007 | Willberg et al. |
| 8,167,043 | B2 | 5/2012 | Willberg et al. |
| 8,220,543 | B2 | 7/2012 | Clark et al. |
| 8,230,925 | B2 | 7/2012 | Willberg et al. |
| 8,584,755 | B2 | 11/2013 | Willberg et al. |
| 8,617,444 | B2 | 12/2013 | Daccord |
| 8,657,002 | B2 | 2/2014 | Willberg et al. |
| 8,757,259 | B2 | 6/2014 | Lesko et al. |
| 8,776,882 | B2 | 7/2014 | Shindgikar et al. |
| 8,778,851 | B2 | 7/2014 | Daccord |
| 9,085,727 | B2 | 7/2015 | Litvinets et al. |
| 2006/0169449 | A1 | 8/2006 | Mang et al. |
| 2012/0322695 | A1 | 12/2012 | Kefi et al. |
| 2013/0274385 | A1 | 10/2013 | Wu et al. |
| 2015/0000911 | A1 | 1/2015 | Cochran |
| 2015/0068747 | A1 | 3/2015 | Hwang et al. |
| 2015/0087560 | A1 | 3/2015 | Abe et al. |
| 2015/0126414 | A1* | 5/2015 | Abe .................. C09K 8/12 507/117 |
| 2016/0053163 | A1 | 2/2016 | Nguyen |
| 2016/0108713 | A1 | 4/2016 | Dunaeva et al. |
| 2017/0088698 | A1 | 3/2017 | Collins et al. |

OTHER PUBLICATIONS

Bivens, Craig H., et al.; "New Fibers for Hydraulic Fracturing", Oilfield Review, Summer 2005, pp. 34-43.

Asiri, Khalid S., et al.; "Stimulating Naturally Fractured Carbonate Reservoirs"; Oilfield Review, Autumn 2013, pp. 4-17.

Kraemer, Chad, et al.; "Unlocking the Potential of Unconventional Reservoirs"; Oilfield Review, Winter 2014/2015, pp. 4-17.

D'Huteau, Emmanuel, et al.; "Open-Channel Fracturing—A Fast Track to Production"; Oilfield Review, Autumn 2011, pp. 4-17.

Almargro, Santiago Pablo Baggini, et al.; "Sealing Fractures: Advances in Lost Circulation Control Treatments", Oilfield Review, Autumn 2014, pp. 4-13.

Inyang, U.A., et al.; "Development and Field Applications of Highly Conductive Proppant-free Channel Fracturing Method"; SPE-168996-MS, 2014, pp. 1-16.

Schlosser, D. J., et al.; "Evolution of Completion Techniques in the Lower Shaunavon Tight Oil Play in Southwestern Saskatchewan", SPE-173368-MS, 2015, pp. 1-12.

Sun, Hong, et al.; "Case Study of Soft Particle Fluid to Improve Proppant Transport and Placement"; SPE-174801-MS, 2015, pp. 1-16.

Medvedev, A., et al.; "On the Mechanisms of Channel Fracturing"; SPE 163836, 2013, pp. 1-13.

Gandossi, Luca, et al.; "An overview of hydraulic fracturing and other formation stimulation technologies for shale gas productions"; JRC Science for Policy Report, European Commission, Update 2015.

\* cited by examiner

FIBER CONFIGURATIONS FOR WELLBORE TREATMENT COMPOSITIONS

CROSS-REFERENCE TO RELATED APPLICATION(S)

This application is a national stage filing under 35 USC §371 of International Application Number PCT/US2017/056187, filed on Oct. 11, 2017, which claims the benefit of the filing date to U.S. Provisional App. Pat. No. 62/406,757, filed on Oct. 11, 2016, the entire disclosures of which are incorporated by reference herein.

BACKGROUND

1. Field of the Invention

The present invention generally relates to wellbore treatment compositions. More particularly, the present invention generally concerns the use of specific types of fibers in wellbore treatment compositions.

2. Description of the Related Art

Hydraulic fracturing is a process for enhancing the output of oil or gas wells by forcing fluid (>95% water) into an existing wellbore under high pressure so as to cause fractures or fissures to occur in the surrounding shale or tight-rock formations. Typically, a hole is drilled vertically, often at least a mile down, and then it gradually is oriented to a horizontal position that extends for several more thousand feet. After the well is drilled, casement placed and cemented in place, small perforations are made in the horizontal section of the pipe. Water is then pumped through these perforations with enough pressure to cause cracks and fissures in the surrounding rock. This allows gateways for additional oil or gas to flow out of the newly formed cracks. However, these passages tend to close when the pumping pressure eases and flow of oil or gas slows or even stops. To avoid this, a proppant such as sand or ceramic beads is usually added to the fracturing fluid so that proppant fills the fissures or cracks during pressurization and then becomes trapped when pump pressure is released. Proppant-filled fractures allow hydrocarbons to flow more freely, increasing the productivity of fractured wells.

Due to the large differences in densities between water and sand or ceramics, significant settling will occur when the two are mixed. This leads to a non-uniform delivery of proppant through the wellbore with ultimate plugging of the wellbore. Ideally, the proppant should be suspended in the fracturing fluid with no settling whatsoever.

One solution to the settling problem is to use fracturing fluids that are more viscous since their viscosity will provide resistance to gravitational settling of the proppant. Viscosifiers such as guar, hydroxypropyl guar (HPG), carboxymethyl HPG (CMHPG), and hydroxyethyl cellulose (HEC) are often used. If desired, still higher viscosities can be achieved by crosslinking the viscosifier with salts of boron, titanium, and zirconium salts. However, there are limits to how high the viscosity of a fracturing fluid can be.

One limitation of such viscous fluids is simply the physical handling/pumping of such fluids since larger motors are needed to deliver the thick heterogeneous suspensions. It is also known that use of fracturing fluids with very high viscosities can lead to fractures with widths larger than desired, which may result in formations in non-producing rock formations or into water. In either case, the well productivity becomes compromised. Ideally, the propped fracture should remain essentially within producing rock formations and with minimal settling of the proppant in the fracturing fluid. However, the requirement of minimal proppant settling while still controlling the fracture geometry often leads to a number of undesirable trade-offs.

One solution to this problem has been to incorporate fibers into the fracturing fluid as described in U.S. Pat. No. 7,275,596, the disclosure of which is incorporated herein by reference in its entirety. Adding fibers can uncouple proppant transfer and solution viscosity as the fibers themselves provide a mechanical means to maintain proppant suspension. This means the viscosity of the fracture fluid can be reduced and savings accrued due to a lower usage of viscosifiers.

Another advantage arising from the use of fibers and the subsequent reduction in fracture fluid viscosity is that less residual viscosifier is left behind in the fractures. This residual viscosifier can interfere with the flow of oil or gas out of the fissure.

While use of fibers can be advantageous for reducing the viscosity of the fracture fluid and for suitable proppant delivery to fissures, one disadvantage of their use is that the fibers can be left behind and trapped in the fissures, which can lead to reduced flow of oil and gas to the well. The solution to this has been to use fibers that are degradable under proppant placement conditions and whose degradation products will not precipitate in the presence of the calcium and magnesium ions usually found in the water. Examples of such degradable fibers include unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, and copolymers of lactic acid with other hydroxy-, carboxylic acid-, or hydroxycarboxylic acid-containing moieties, and mixtures of those materials.

The problem with these degradable polymers is that they tend to decompose at temperatures approaching 100° C., and as such, their utility becomes limited. Typical wellbore temperatures can range from 100 to 200° C. and so stability and utility of such fibers are limited. Furthermore, certain degradable fibers may leave residues that tend to precipitate salts in the presence of the excessive amounts of calcium or magnesium in connate water.

Thus, there is a need for a fiber that can sustain higher degradation temperatures and still maintain a proppant suspension.

SUMMARY

One or more embodiments of the present invention generally concern a wellbore treatment composition. The wellbore treatment composition comprises a carrier fluid, a proppant, and a plurality of degradable fibers comprising a cellulose ester. Furthermore, the degradable fibers exhibit an average fiber surface area to volume ratio in the range of 10 to 1,000 $mm^{-1}$.

One or more embodiments of the present invention generally concern a wellbore treatment composition comprising a carrier fluid, a proppant, and a plurality of degradable fibers. The degradable fibers can comprise a cellulose ester. Furthermore, the degradable fibers are (i) bent fibers, (ii) non-circular fibers, or (iii) hybrid fibers, wherein the bent fibers have an average effective length that is not more than 75 percent of the actual length of the bent fibers, the non-circular fibers have an average cross-sectional perimeter dimension that is at least 125 percent of the average cross-sectional perimeter dimension of equivalent circular fibers having the same cross-sectional area as the non-circular fibers, and the hybrid fibers have the characteristics of both the bent fibers and the non-circular fibers.

One or more embodiments of the present invention generally concern a wellbore treatment composition comprising a carrier fluid, a proppant, and a plurality of trilobal fibers.

BRIEF DESCRIPTION OF THE FIGURES

Embodiments of the present invention are described herein with reference to the following drawing figures, wherein.

DETAILED DESCRIPTION

The present invention is intended to exploit the use of cellulose ester fibers with various cross-sectional shapes as a suspension aid for proppants in wellbore treatment compositions. It has been surprisingly learned that the cross-sectional shapes of the fibers can play a key role in this application.

In particular, the present invention demonstrates that the suspension of proppants in hydraulic fracturing applications can be strongly affected by the cross-sectional shapes and lengths of the fibers present in the wellbore treatment compositions. For example, crimped cellulose ester fibers with a trilobal cross-section and an optimized length can provide desirable suspension of proppants in wellbore treatment fluids.

It was also surprisingly discovered that the shape of the fiber cross-section can strongly influence the ability of the fiber to effectively disperse the proppant in aqueous fracturing solutions. As discussed below, standardized settling procedures were used to compare the settling rates for various cellulose ester fibers with a range of cross-sectional geometries and to that of a polylactic acid fiber with a circular cross-section.

In various embodiments, the fibers of the present invention can be: (i) bent fibers, (ii) non-circular fibers, or (iii) hybrid fibers. As used herein, "bent fibers" refer to fibers an average effective length that is not more than 75 percent of the actual length of the bent fibers. As used herein, "effective length" refers to the maximum dimension between any two points of a fiber. Furthermore, "actual length" refers the end-to-end length of a fiber if it were perfectly straightened. If a fiber is straight, its effective length is the same as its actual length. However, if a fiber is curved and/or crimped, its effective length will be less than its actual length, where the actual length is the end-to-end length of the fiber if it were perfectly straightened. If a fiber is highly curved or entangled, the effective length of the fiber may not be measured between the ends of the fiber; but, instead, will be measured between the two points on the fiber that are farthest apart from one another. For example, if a fiber is curved into a circular shape with its ends touching, the effective length of the fiber will be the diameter of the circle formed by the fiber. In various embodiments, the bent fibers have an average effective length that is not more than 75, 50, 40, 30, or 20 percent of the actual length of the bent fibers.

As used herein, "non-circular fibers" refer to fibers having an average cross-sectional perimeter dimension that is at least 125 percent of the average cross-sectional perimeter dimension of equivalent circular fibers having the same cross-sectional area as the non-circular fibers. In various embodiments, the non-circular fibers have an average cross-sectional perimeter dimension that is at least 125, 150, 200, 250, 300, 350, or 400 percent of the average cross-sectional perimeter dimension of equivalent circular fibers having the same cross-sectional area as the non-circular fibers.

As used herein, "hybrid fibers" refers to fibers that have the characteristics of both the bent fibers and the non-circular fibers.

In various embodiments, the fibers of the present invention can have a non-circular (i.e., non-round) cross-sectional shape. Exemplary non-circular cross-sectional shapes include a trilobal cross-sectional shape, an X-shaped cross-sectional shape, a popcorn shape, a triangular cross-sectional shape, a star cross-sectional shape, a square cross-sectional shape, an octagonal cross-sectional shape, or other types of polygonal cross-sectional shapes. In certain embodiments, the fibers of the present invention comprise a trilobal cross-sectional shape.

Furthermore, in various embodiments, the fibers of the present invention can be crimped. In such embodiments, the average angle of the crimp pitch in the fibers can range from 30, 35, 40, or 45 to 60, 55, or 50 degrees. In one or more embodiments, the fibers can comprise a crimping frequency greater than 6 crimp pitch peaks per 10 mm. Moreover, in various embodiments, the fibers can comprise an average crimp pitch height of at least 0.5, 1.0, or 1.5 mm and/or not more than 5, 3, or 2 mm.

Based on recent experimental observations, the cross-sectional fiber shapes can generally be ranked as follows based on their abilities to maintain proppant suspensions in wellbore treatment compositions: trilobal (crimped)>trilobal (uncrimped)>X-shaped>popcorn/octagonal (amorphous) (ranked from most desirable to less desirable). As described further below, the cellulose ester fibers described herein allow for better suspension properties relative to polylactic acid fibers with a round cross-section when measured by a standardized proppant suspension test.

The other physical dimensions of the fibers of the present invention, in particular the surface area of the fiber, can be varied as desired depending on the intended use of the fibers. In various embodiments, it is desirable to maximize the surface area of the fibers, which can allow the fibers to better suspend the proppants in the wellbore treatment compositions.

In various embodiments, the fibers can have an average cross-sectional surface area of at least 25, 50, 75, 100, 150, 200, 250, 300, 350, 400, 450, or 500 $\mu m^2$ and/or not more than 1,000, 900, 800, 700, or 600 $\mu m^2$. In one or more embodiments, the fibers can have an average surface area of at least 0.1, 0.2, 0.3, 0.35, 0.4, 0.45, 0.5, 0.55, 0.6, 0.65, 0.7, 0.75, or 0.8 mm² and/or not more than 1.5, 1.2, 1.0, or 0.9 mm².

The fibers of the present invention can have an average volume of at least 0.5, 1.0, 1.5, or 2.0 mm³ and/or not more than 5.0, 4.5, 4.0, or 3.5 mm³. In various embodiments, the fibers can have an average fiber surface area to volume ratio of at least 10, 100, 125, 150, 175, 200, 225, 250, or 275 mm⁻¹ and/or not more than 1,000, 750, 600, 500, or 350 mm⁻¹.

In various embodiments, the fibers can have an average actual length of at least 0.1, 0.25, 0.5, 1, 2, 3, 4, or 5 mm and/or not more than 100, 75, 50, 40, 30, or 25 mm. Additionally or alternatively, the fibers can have a denier of at least 0.1, 0.5, 1, 5, 10, 50, 100, 250, 500, 750, 1,000, or 1,500 and/or not more than 5,000, 4,500, 4,000, 3,500, 3,000, 2,500, 2,000, 1,000, 500, or 100.

Furthermore, in various embodiments, the fibers can have an average cross-sectional diameter of at least 0.5, 1, 2, 5, or 10 µm and/or not more than 200, 150, 100, 50, or 30 µm. In other embodiments, the fibers can have an average cross-sectional perimeter dimension of at least 10, 25, 50, 55, 60, 65, 70, 75, 80, 85, 90, 95, 100, 105, 110, 115, 120, or 125 µm and/or not more than 400, 300, 200, or 150 µm.

Further, in various embodiments, the fibers can have an average longitudinal aspect ratio of at least 1, 2, 5, or 10 and/or not more than 5,000, 4,000, 3,000, 2,000, or 1,000. As used herein, the "longitudinal aspect ratio" refers to the actual length of the fiber divided by the maximum diameter of the fiber. Additionally or alternatively, the fibers can have a transverse aspect ratio of at least 0.1, 0.5, 0.75, 1, or 1.5 and/or not more than 10, 7, 5, or 2. As used herein, the "transverse aspect ratio" denotes the ratio of a fiber's maximum transverse dimension (width) to the fiber's minimum transverse dimension (thickness).

In certain embodiments of the present invention, the fiber can have a denier per filament (dpf) of at least 0.1, 0.5, 1, 2, 3, 4, 5, 6, 7, 8, 9, or 10 and/or not more than 1,000, 750, 500, 250, 100, 50 or 6.

In various embodiments, the fibers of the present invention comprise monocomponent fibers. Furthermore, in various embodiments, the fibers can comprise solid (i.e., non-hollow) fibers.

In particular, cellulose ester fibers have been identified as a suitable candidate for use as fibers in fracturing applications. Generally, the rates of thermal degradation of cellulose esters are slower than that of aliphatic polyesters and so provide a longer time of usefulness under typical wellbore conditions. Exemplary cellulose ester fibers and formulations that may be utilized in the present invention are discussed in U.S. Ser. No. 15/268,661, filed on Sep. 19, 2016, the entire disclosure of which is incorporated herein by reference in its entirety.

Cellulose esters are well known compounds. Examples of cellulose esters that can be used in the present invention include cellulose acetate, cellulose propionate, cellulose butyrate, cellulose acetate propionate, cellulose acetate phthalate, and cellulose acetate butyrate. Cellulose esters are generally prepared by first converting cellulose to a cellulose triester before hydrolyzing the cellulose triester in an acidic aqueous media to the desired degree of substitution (i.e., average number of substituents per anhydroglucose monomer unit).

In various embodiments, the fibers of the present invention can comprise at least 10, 25, 35, 50, 70, 75, 80, 85, 90, 95, 99, or 100 weight percent of one or more cellulose esters. In certain embodiments, the fibers can consist essentially of or consist of one or more cellulose esters. In other embodiments, a single cellulose ester makes up at least 75, 90, 95, 99, or 100 percent of the total weight of the fibers.

Since cellulose esters are generally produced from highly-purified cellulose, various compositional attributes (including molecular weight, polydispersity, acyl constituent type, acyl degree of substitution, etc.) can be modified, which in turn can provide means for controlling the degradation rate of the fibers in the hotter well environments. Thus, there are many different ways to modify the degradation properties of the cellulose ester.

For instance, the acyl degree of substitution ("DS") of the cellulose ester can greatly impact the degradation rate of fibers derived therefrom. The theoretical maximum value for the DS in a cellulose ester is 3.0 (based on anhydroglucose representing the repeat unit for cellulose, as is a common theoretical treatment).

In various embodiments of the present invention, the cellulose ester can have a Total DS of at least 0.5, 1.0, 1.5, 1.8, 1.9, 2.0, 2.1, 2.2, 2.3, 2.4, 2.5, 2.6, 2.7, 2.8, or 2.9. Additionally or alternatively, the cellulose ester can have a Total DS of not more than 3.0, 2.9, 2.8, 2.7, 2.6, 2.5, 2.4, 2.3, 2.2, 2.1, 2.0, 1.9, 1.8, 1.7, 1.6, or 1.5.

Furthermore, the cellulose esters of the present invention can include one or more acyl groups. For example, the cellulose esters can comprise acyl groups including aliphatic and/or aromatic C2-C12 substituents. In various embodiments, the cellulose esters can comprise an acetate, a propionate, a butyrate, a phthalate, an aromatic-containing acyl group, or combinations thereof. In certain embodiments, the cellulose esters comprise acetate and/or propionate. Examples of cellulose esters that can be used in the present invention include cellulose acetate, cellulose propionate, cellulose butyrate, cellulose acetate propionate, cellulose acetate butyrate, cellulose acetate phthalate, and combinations thereof. As discussed further below, a particularly useful cellulose ester in the present invention is cellulose acetate. In yet other embodiments, the cellulose ester may comprise a carboxylated cellulose ester. For instance, the cellulose esters described herein may be in the form of carboxylated cellulose esters having pendant groups such as succinic acid, maleic acid, adipic acid, hexahydrophthalic acid, crotonic acid, acrylic acid, and/or methacrylic acid.

In one or more embodiments, a cellulose acetate can make up at least 25, 50, 75, 90, or 100 percent of the total weight of the cellulose esters forming the fiber. In other embodiments, a cellulose acetate propionate makes up less than 75, 50, 25, 10, 5, or 1 percent of the total weight of the cellulose esters forming the fibers.

Cellulose acetate is thought to be among the most commercially useful derivatives of cellulose and its specific physical and chemical properties generally depend largely on the DS of acetate on the three free hydroxyl groups of a glucose monomer unit. Cellulose acetate materials can be dry-spun from cellulose acetates with $DS_{acetyl}$ values of about 2.5 or lower from acetone solutions commonly called "dopes." Generally, cellulose acetate polymers having a $DS_{acetyl}$ of above 2.5 will exhibit very limited solubility in acetone. However, cellulose acetates with lower $DS_{acetyl}$ values can be dry spun effectively, although solvent additives (including water) may be required for polymers with $DS_{acetyl}$ of less than about 2.2. Exemplary solvents that may be used to form dopes with the cellulose acetates include water, acetone, methylethyl ketone, methylene chloride, dioxane, dimethyl formamide, methanol, ethanol, glacial acetic acid, supercritical $CO_2$, or combinations thereof.

It has been observed that the $DS_{acetyl}$ value for cellulose acetate polymers can have a significant impact on the degradation rates of the fibers derived therefrom. In various embodiments, the cellulose esters can have a $DS_{acetyl}$ of at least 0.5, 1.0, 1.5, 1.8, 1.9, 2.0, 2.1, 2.2, 2.3, 2.4, 2.5, 2.6, 2.7, 2.8, or 2.9. Additionally or alternatively, the cellulose esters can have a $DS_{acetyl}$ of not more than 3.0, 2.9, 2.8, 2.7, 2.6, 2.5, 2.4, 2.3, 2.2, 2.1, 2.0, 1.9, 1.8, 1.7, 1.6, or 1.5.

In various embodiments, the cellulose esters can comprise a mixed cellulose ester. As used herein, a "mixed cellulose ester" refers to a cellulose ester comprising at least two different acyl substituents. Examples of mixed cellulose esters include cellulose acetate propionate, cellulose acetate phthalate, and cellulose acetate butyrate. In certain embodiments, the mixed cellulose esters can comprise a higher DS for one of the acyl substituents relative to the other acyl substituent. For example, the cellulose esters can have a higher DS of acetate compared to a DS of propionate. In certain embodiments, the mixed cellulose esters can have a DS of acetate of at least 0.5, 1, 1.5, 2, or 2.5 and/or a DS of a non-acetate acyl substituent of less than 2.5, 2, 1.5, 1, 0.5, or 0.1.

In various embodiments, the DS of the specific acyl substituents on the cellulose esters can affect the resulting degradation rates of the fibers. Thus, in various embodiments, the cellulose esters can have a DS for a specific acyl substituent of at least 0.5, 1.0, 1.5, 1.8, 1.9, 2.0, 2.1, 2.2, 2.3, 2.4, 2.5, 2.6, 2.7, 2.8, or 2.9. Additionally or alternatively, the cellulose esters can have a DS for a specific acyl substituent of not more than 3.0, 2.9, 2.8, 2.7, 2.6, 2.5, 2.4, 2.3, 2.2, 2.1, 2.0, 1.9, 1.8, 1.7, 1.6, or 1.5. These specific acyl substituents can comprise acetate, butyrate, propionate, or phthalate.

Furthermore, in various embodiments, the cellulose esters can have a DS for a carboxyl pendant group of at least 0.5, 1.0, 1.5, 1.8, 1.9, 2.0, 2.1, 2.2, 2.3, 2.4, 2.5, 2.6, 2.7, 2.8, or 2.9. Additionally or alternatively, the cellulose esters can have a DS for a carboxyl pendant group of not more than 3.0, 2.9, 2.8, 2.7, 2.6, 2.5, 2.4, 2.3, 2.2, 2.1, 2.0, 1.9, 1.8, 1.7, 1.6, or 1.5. As noted above, such carboxyl pendant groups can comprise succinic acid, maleic acid, adipic acid, hexahydrophthalic acid, crotonic acid, acrylic acid, and/or methacrylic acid.

In various embodiments, the cellulose esters can have a weight average molecular weight in the range from 1,500 to 850,000, 40,000 to 200,000, or 55,000 to 160,000 Da. The cellulose esters can also have a number average molecular weight ("Mn") in the range of 1,500 to 850,000, 40,000 to 200,000, or 55,000 to 160,000 Da. Additionally or alternatively, the cellulose esters can have a polydispersity in the range from 1.2 to 7, 1.5 to 5, or 1.8 to 3. Furthermore, in various embodiments, the cellulose esters can have a degree of polymerization ("DP") of at least 5, 10, 25, 50, or 100 and/or not more than 500, 400, or 250.

The cellulose esters can be amorphous, semi-crystalline, or crystalline. In one or more embodiments, the cellulose esters used in the present invention are semi-crystalline.

Many fiber spinning methods, including wet-spinning, dry-spinning, melt-spinning, and electro-spinning, can be used to form the fibers from cellulose esters. Thus, the fibers described herein can be produced using any one of these spinning methods.

In certain embodiments of the present invention, the fibers are produced via dry-spinning. Drying-spinning, as commonly practiced, allows for facile adjustment of the physical dimension aspects of the fibers and this technique also opens up possibilities for including thermally-labile additives. Generally, dry-spinning involves spinning a concentrated solution of cellulose ester dissolved in a solvent through a spinneret consisting of many small holes into hot air, where the solvent quickly evaporates thereby leaving fibrous strands. While alternative means of manufacture exist for some of the compositions, dry-spinning generally represents a cost-effective means of producing the degradable fibers at high speeds and largescale volumes.

In various embodiments of the present application, the fibers can comprise a dry-spun, unplasticized cellulose acetate. It has been observed that these materials have advantages over prior art materials (PLA and the like) in that they degrade appreciably slower, but predictably, at higher temperatures and pressures, which reflect the conditions encountered in hotter wells (e.g., temperatures in excess of 130° C.).

In various embodiments, the fibers of the present invention are degradable under proppant placement conditions and whose degradation products will not precipitate in the presence of calcium and magnesium ions usually found in the water. Thus, in various embodiments of the present invention, the fibers described herein are degradable fibers. In certain embodiments, the fibers described herein are degradable fibers formed from a degradable cellulose ester.

Accordingly, certain embodiments of the present invention provide a degradable fiber that degrades at a desirable rate in a hot, pressurized, and/or high ionic strength environment, such as, for example, the environment found in certain oil and gas wells.

The degradation rate of the degradable fiber may vary depending on the particular application. In general, however, it is desired for the fiber to substantially maintain its physical integrity during the particular operation being performed, but then degrade fairly rapidly and completely after the operation has been completed in order to permit later operations where the presence of the intact physical material is not desired. For example, a degradable fiber can be very helpful during a hydraulic fracturing operation for facilitating proper transport and placement of proppants. However, after fracturing, the continued presence of the degradable material can delay or inhibit production of hydrocarbons from the well. Thus, it is desirable for the degradable fiber to completely degrade in a relatively rapid fashion after fracturing is completed.

The rate of degradation of the fibers depends on a number of physical and chemical factors of both the degradable fiber and the environment around the fiber. Physical factors of the degradable fiber that may affect its degradation rate include, for example, shape, dimensions, roughness, and porosity. Physical factors of the environment that may affect degradation rate include, for example, temperature, pressure, and agitation. Of course, the relative chemical make-up of the degradable fiber and the environment within which it is placed can greatly influence the rate of degradation of the fiber. For example, some materials degrade rapidly in hydrocarbons, but not in aqueous environments, while other materials degrade rapidly in aqueous environments, but not in hydrocarbons.

In certain embodiments, the degradable fibers of the present invention degrade fast enough to exhibit a percent weight loss of at least 25, 40, 50, 65, 75, 80, 85, 90, 95, 98, 99, or 100 percent at 18, 14, 10, 7, 6, 4, 3, 2, or 1 days. Additionally or alternatively, the degradable fibers can degrade slow enough to exhibit a percent weight loss of not more than 50, 45, 40, 35, 30, 25, 20, 15, 10, or 5 weight percent at 0.05, 0.1, 0.25, 0.5, 0.75, 1, or 2 days. The foregoing degradation rates can apply to any environment within which the degradable fibers are employed. However, in one or more embodiments, the degradable fibers can exhibit the foregoing degradation rates when employed in an environment of deionized water that is maintained in the liquid phase at a temperature of 130° C.

In other embodiments, the degradable fibers exhibit the foregoing degradation rates in an aqueous medium having a relatively high temperature, high pressure, and/or high ionic strength. Such conditions are commonly found in subterranean wells. Accordingly, the aqueous medium in which the degradable fiber exhibits the foregoing degradation rates can comprise at least 25, 50, 75, 90, or 95 percent water. The temperature of the aqueous medium can be at least 100° C., 110° C., 120° C., 130° C., 140° C., or 150° C. The pressure of the aqueous medium can be at least 1.25 atmospheres, 2 atmospheres, 4 atmospheres, 6 atmospheres, 8 atmospheres, or 10 atmospheres. The ionic strength of the aqueous medium can be at least 0.01 M, 0.05 M, 0.1 M, or 0.2 M.

As noted above, the degradable fibers formed herein can be produced from a cellulose ester. It has been observed that degradable fibers formed from cellulose esters can ideally degrade, both chemically and physically, when subjected to the conditions present in oil and gas wells.

Another means of modifying the degradation properties of fibers can be provided through the use of additives, some of which enter in the course of manufacturing the cellulose ester polymers and others which can be added to the spinning solutions (dopes) used to form the fibers. Examples of additives that can be used include sulfur-based compounds, plasticizers, clays, carbonates, titanium dioxide, titanium oxide, sodium carbonate, calcium carbonate, acetone soluble organic acids (e.g., citric acid), or combinations thereof. For instance, the fibers can comprise at least 0.5, 1, 3, 5, 8, or 10 and/or not more than 30, 25, 20, or 15 weight percent of one or more additives. In certain embodiments, the fibers can comprise at least 0.5, 1, 3, 5, 8, or 10 and/or not more than 30, 25, 20, or 15 weight percent of citric acid or sulfate. In other embodiments, the fibers can comprise at least 0.5, 1, 3, 5, 8, or 10 and/or not more than 30, 25, 20, or 15 weight percent of citric acid. In yet other embodiments, the cellulose esters used to produce the fibers can comprise at least 0.5, 1, 3, 5, 8, or 10 and/or not more than 30, 25, 20, or 15 weight percent of sulfate.

In various embodiments, the degradation properties of the fibers can be modified through the use of a degradation promoter, which can be added to the fiber during the spinning process. For example, the degradation promoter can be selected from the group consisting of an inorganic acid, an inorganic salt, an inorganic base, an organic base, an organic acid, an organic salt, and combinations thereof. As used herein, a "degradation promoter" refers to any material whose addition to a cellulose ester, for example cellulose acetate, causes an increase in the rate of degradation of the cellulose acetate material in deionized water at 130° C.

In one or more embodiments, the degradation promoter is an organic acid, inorganic acid, salt of an organic acid, salt of an inorganic acid or combinations thereof. In various embodiments, the fibers can comprise less than 10, 9, 8, 7, 6, 5, 4, 3, 2, 1, or 0.5 weight percent of one or more degradation promoters.

In certain embodiments, the degradation promoter can be selected from the group consisting of hydrochloric acid, nitric acid, phosphoric acid, sulfuric acid, sulfurous acid, boric acid, hydrofluoric acid, hydrobromic acid, chloric acid, perchloric acid, nitric acid, nitrous acid, phosphate, sulfate, sulfite, borate, chlorate, phosphate, perchlorate, nitrate, nitrite, formic acid, acetic acid, propionic acid, butyric acid, valeric acid, citric acid, tartaric acid, oxalic acid, lactic acid, malic acid, benzoic acid, formate, acetate, propionate, butyrate, valerate citrate, tartrate, oxalate, lactate, malate, maleic acid, maleate, phthalic acid, phthalate, benzoate, and combinations thereof.

In certain embodiments, the cellulose esters and the fibers formed therefrom do not contain a plasticizer. More specifically, the cellulose esters and the fibers formed therefrom can comprise less than 2, 1, 0.5, 0.1, or 0.01 weight percent of a plasticizer.

In various embodiments, the fibers of the present invention may be coated or not depending upon the desire to adjust their hydrophobicity, lubricity, adhesiveness, and/or rate of hydrolysis.

Although additives may be added to the fibers, these additives may not be in the form of a coating in certain embodiments. In various embodiments, the fibers do not comprise a coating. In certain embodiments, the fibers are not coated or sized with a lipophilic coupling agent.

In various embodiments, the fibers can contain water-soluble salts that can be used to adjust the surface roughness or coarseness of the fibers as these salts dissolve out of the polymer upon exposure to water.

Additionally, in various embodiments, the fibers described herein can comprise one or more fillers to vary the modulus or stiffness of the fiber as desired.

In various embodiments, the fibers of the present invention comprise less than 10, 5, 1, 0.1, or 0.01 weight percent of polylactic acid, polyglycolic acid, polyvinyl alcohol, polystyrene, poly (methyl methacrylate), polyethylene terephthalate, polyethylene, or polypropylene. In certain embodiments, the fibers of the present invention do not contain polylactic acid, polyglycolic acid, polyvinyl alcohol, polystyrene, poly (methyl methacrylate), polyethylene terephthalate, polyethylene, or polypropylene. In other embodiments, the fibers comprise less than 10, 5, 1, 0.1, or 0.01 weight percent of polylactic acid and/or polyglycolic acid. In yet other embodiments, the fibers do not contain polylactic acid and/or polyglycolic acid.

Furthermore, in various embodiments, the fibers of the present invention can comprise less than 10, 5, 1, 0.1, or 0.01 weight percent of an unsubstituted lactide; a glycolide; a polylactic acid; a polyglycolic acid; copolymers of polylactic acid and polyglycolic acid; copolymers of glycolic acid with other hydroxy-, carboxylic acid-, or hydroxycarboxylic acid-containing moieties; and/or copolymers of lactic acid with other hydroxy-, carboxylic acid-, or hydroxycarboxylic acid-containing moieties.

The fibers described herein, in particular the cellulose ester fibers, can be used in wellbore treatment fluids useful in various gas and oil applications. For example, the wellbore treatment fluids can be in the form of slurries and be selected from the grouping consisting of a hydraulic fracturing fluid, a drilling fluid, a channelant formation agent, a completion fluid, a flowback control agent, a proppant transport fluid, a viscosifier extension agent, a plug flow agent, or a fluid carrier. In certain embodiments, the fibers described herein can be used in a hydraulic fracturing fluid, which can also comprise a proppant and carrier fluid.

In various embodiments, the wellbore treatment compositions can comprise at least 0.1, 0.5, 1, 2, 3, 4, 5, 6, 7, 8, 9, 10, 15, 20, 25, 30, 35, 40, 45, 50, 55, 60, 65, or 70 weight percent of the fibers described herein. Additionally or alternatively, the wellbore treatment compositions can comprise less than 99, 95, 90, 85, 80, 75, 70, 65, 60, 55, 50, 45, 40, 35, 30, 25, 20, 15, 10, 5, or 2.5 weight percent of the degradable fibers described herein. Furthermore, in various embodiments, the weight ratio of the degradable fibers to the proppant in the wellbore treatment composition can be at least 0.01:1, 0.05:1, 0.1:1, 0.5:1, or 1:1 and/or not more than 10:1, 5:1, or 2:1.

Any additives normally used in wellbore treatment compositions may also be included in the treatment fluids as long as they are compatible with the fibers described herein. Such additives can include, for example, antioxidants, crosslinkers, corrosion inhibitors, delay agents, biocides, buffers, fluid loss additives, and combinations thereof.

In various embodiments, the degradable fibers described herein can be used by: (a) injecting a slurry comprising a carrier fluid, a proppant, and the degradable fibers into a wellbore in a subterranean formation; (b) pressurizing the slurry to thereby form fractures in a portion of the subterranean formation having a temperature exceeding 130° C.; and (c) introducing the proppant and the degradable fibers into the formed fractures. It should be noted that the temperatures in the wellbore can differentiate depending on a number factors including, geography and depth of the wellbore. For instance, the temperatures of the wellbores can exceed 130° C., 135° C., 140° C., 150° C., or 175° C.

The fibers described herein can be useful in fracturing applications, either in conjunction with any suitable hydraulic fracturing fluid, including a conventional fracturing fluid that includes a carrier fluid and a viscosifying agent or a fracturing fluid that comprises a cement composition. The degradable fibers described herein are also useful in fracturing operations that do not involve a cement composition to form a proppant pack in a fracture having voids to increase its permeability. The degradable fibers described herein may also be incorporated within a gravel pack composition so as to form a gravel pack down hole that provides some permeability from the degradation of the materials.

The degradable fibers described herein can also be used as bridging agents in well treatment fluids to divert fluid flow and to stop the fluid loss. Typically, fibers used to treat hydrocarbon wells may need to be stable for several weeks, for example 1 to 2 weeks or 2 to 3 weeks at the downhole temperatures, until the well formation is complete. After the completion, these fibers should gradually degrade, either mechanically or chemically, to allow the fracture be reopened for oil or gas production. As previously discussed, in higher temperature conditions, the most commonly used commercial fibers are either too stable to allow fractures to reopen or too unstable that they degrade before well completion. In contrast, the cellulose ester fibers described herein provide controlled degradation rates that are ideal for higher temperature wellbore applications.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

Figure 1:
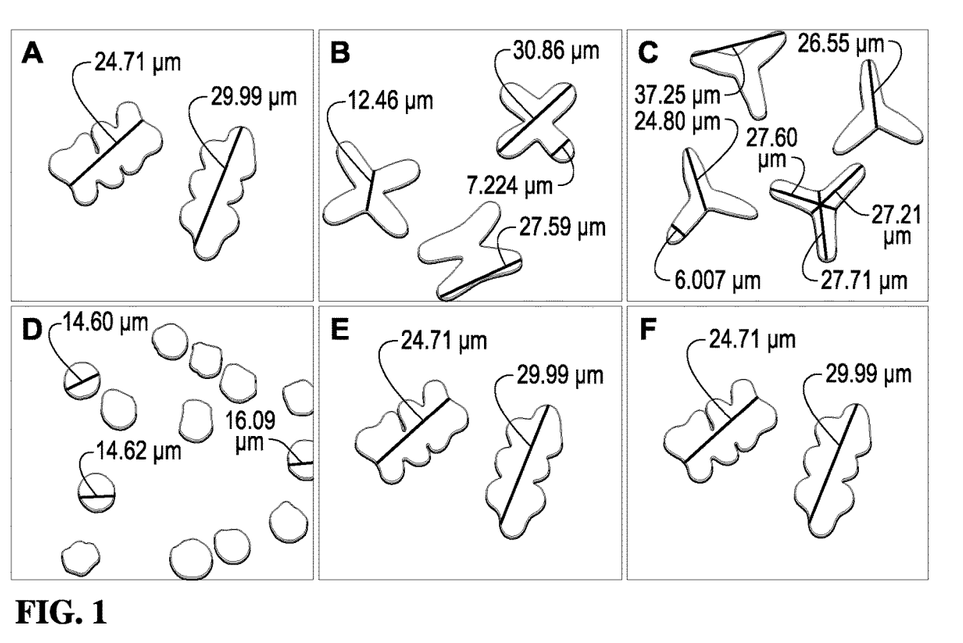
FIG. 1 depicts the fiber cross-sectional geometries of the fibers in Example 1.

Cellulose acetate-based fibers were produced from Eastman cellulose acetate (CA-394-60S) polymer with a dry spinning process using acetone as a solvent. To probe the effect of fiber morphological properties on proppant settling performance, three fiber variables were selected: fiber length, fiber cross-sectional geometry, and fiber form (e.g., straight or crimped). The crimping process served to emboss a crimping structure onto each filament. In order to study the effect of fiber cross-sectional geometry, four different geometries were tested including octagonal, X-shaped, trilobal, and round. Microscopy images and the approximate dimensions of the different fiber geometries are depicted in FIG. 1 at 1000-2000× magnification. As shown in FIG. 1, (A) is the cellulose acetate octagonal ("popcorn"), (B) is the cellulose acetate "X-shape," (C) is the cellulose acetate "trilobal," (D) is the poly-lactic acid "round," (E) is the straight fibers, and (F) is the crimped fibers.

Additional information regarding the tested fibers is provided below in Table 1.

TABLE 1

Fiber samples with varying length, shape, and cross-section

| Polymer | Cross Sectional Geometry | Length (mm) | DPF[a] | DS[b] | Form |
|---|---|---|---|---|---|
| Cellulose Acetate | Octagonal/Popcorn | 6 | 4.0 | 2.48 | Straight |
| Cellulose Acetate | Octagonal/Popcorn | 18 | 4.0 | 2.48 | Straight |
| Cellulose Acetate | X - Shape | 6 | 4.0 | 2.48 | Straight |
| Cellulose Acetate | Trilobal | 6 | 4.0 | 2.48 | Straight |
| Cellulose Acetate | Trilobal | 4.5 | 4.0 | 2.48 | Crimped |
| Poly-Lactic Acid | Round | 6 | 1.5 | N/A | Straight |

[a]denier per fiber
[b]degree of substitution per anhydroglucose unit

To create the non-crosslinked base polymer fluid, 1.67 g of powdered guar gum (Sigma Aldrich) was added to 350 mL of DI water to reach an effective concentration of 40 lbm guar/1000 gal water. While adding guar, the mixture was stirred continuously with a magnetic stirrer at >700 rpm to prevent clumping. After 30 minutes, 7.25 g (2 wt. %) of KCl (Sigma Aldrich >99% purity) was added to the guar-water mixture and then the sample was allowed to hydrate overnight (12+ hours).

Figure 2:
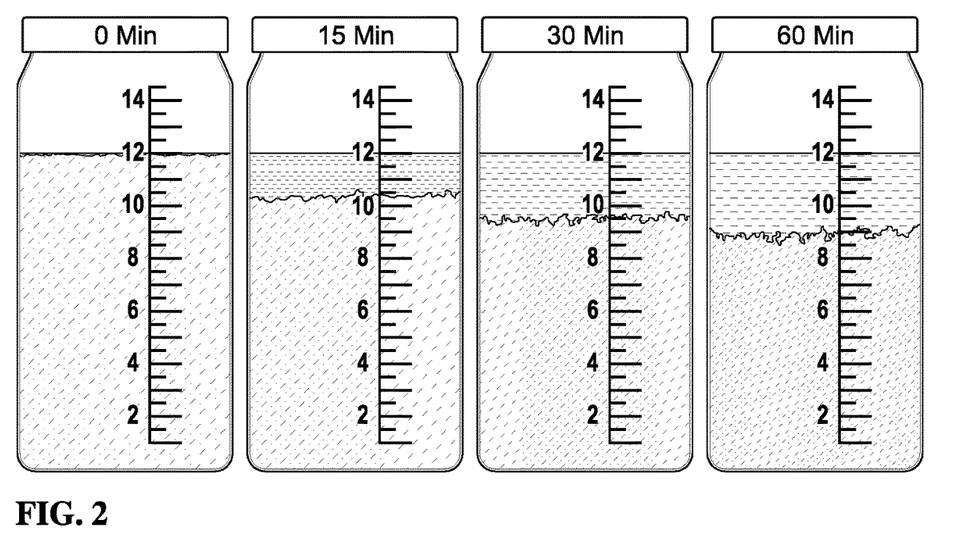
FIG. 2 depicts photographs of the containers throughout the 60 minute settling period in Example 1.

After hydrating the guar, polymer fibers were introduced to the guar-water system at 1 weight % and mixed for one hour at 700 rpm using a magnetic stirrer. After the one hour fiber mixing period, 20/40 mesh Bauxlite® proppant (Saint-Gobain proppants) was added to the mixture at a concentration of 2 lbm proppant/gal of fluid (PPA). The mixture was placed in a larger rotary mixer and mixed at 100 rpm for 10 minutes to ensure all components were evenly dispersed. At the end of the mixing procedure, the mixtures were transferred back into the glass jars and the settling behavior of the proppant was recorded as a function of time. Due to the run-to-run variability and inherent uncertainty involved with visually determining the settling rate of proppant from video, each run was performed eight times to minimize error. Photographs of the containers throughout the 60 minute settling period are shown in FIG. 2. In other words, FIG. 2 depicts photographs of a typical static bottle test showing proppant degree of settling over time.

Next, the cellulose acetate fibers having various properties were evaluated for their ability to suspend proppant. In particular, the following factors were evaluated: (1) geometry/fiber morphology; (2) fiber weight content; (3) fiber linear density; and (4) aspect ratio (crimping effects). The results of these various proppant suspension tests are shown in FIGS. 3-9. The data presented in the FIGS. were generated separately.

Figure 3:
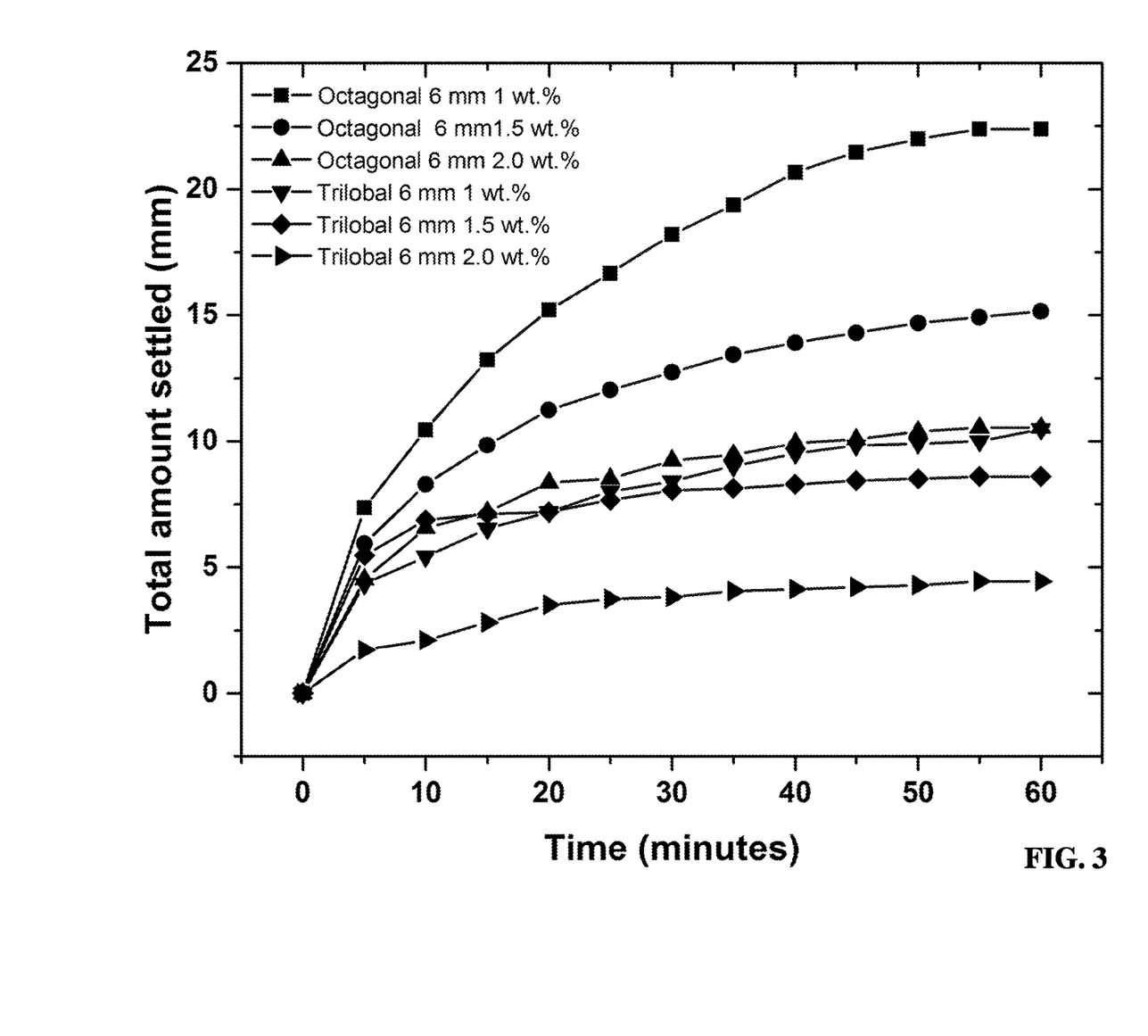
FIG. 3 depicts a graph showing the effects of fiber weight percentage on proppant suspension.

FIG. 3 depicts the effects of the weight percentage of uncrimped cellulose acetate on the suspension of the proppant. As shown in FIG. 3, higher concentrations of fibers improved the suspension of proppant. In addition, trilobal fibers significantly outperformed those with octagonal (popcorn) geometry at the same concentration.

Figure 4:
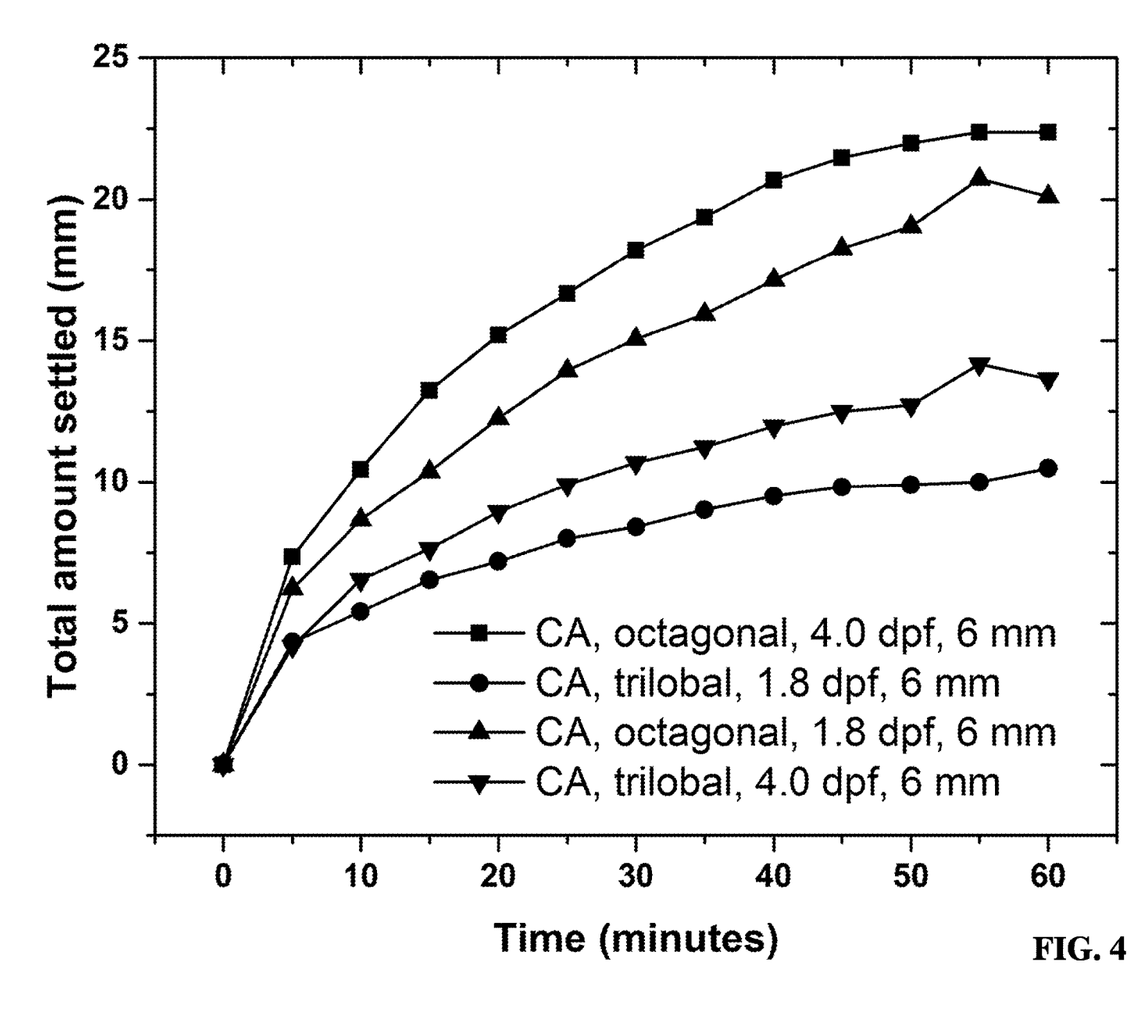
FIG. 4 demonstrates the effects of fiber linear density on the suspension of the proppant.

FIG. 4 demonstrates the effects of the linear density of uncrimped cellulose acetate fibers on the suspension of the proppant. Fiber linear density was investigated using the standard settling test conditions and the results are displayed in FIG. 4. As shown in FIG. 4, lower fiber denier per fiber (DPF) resulted in less settling. Once again, trilobal fibers outperformed octagonal (popcorn) fibers.

Figure 5:
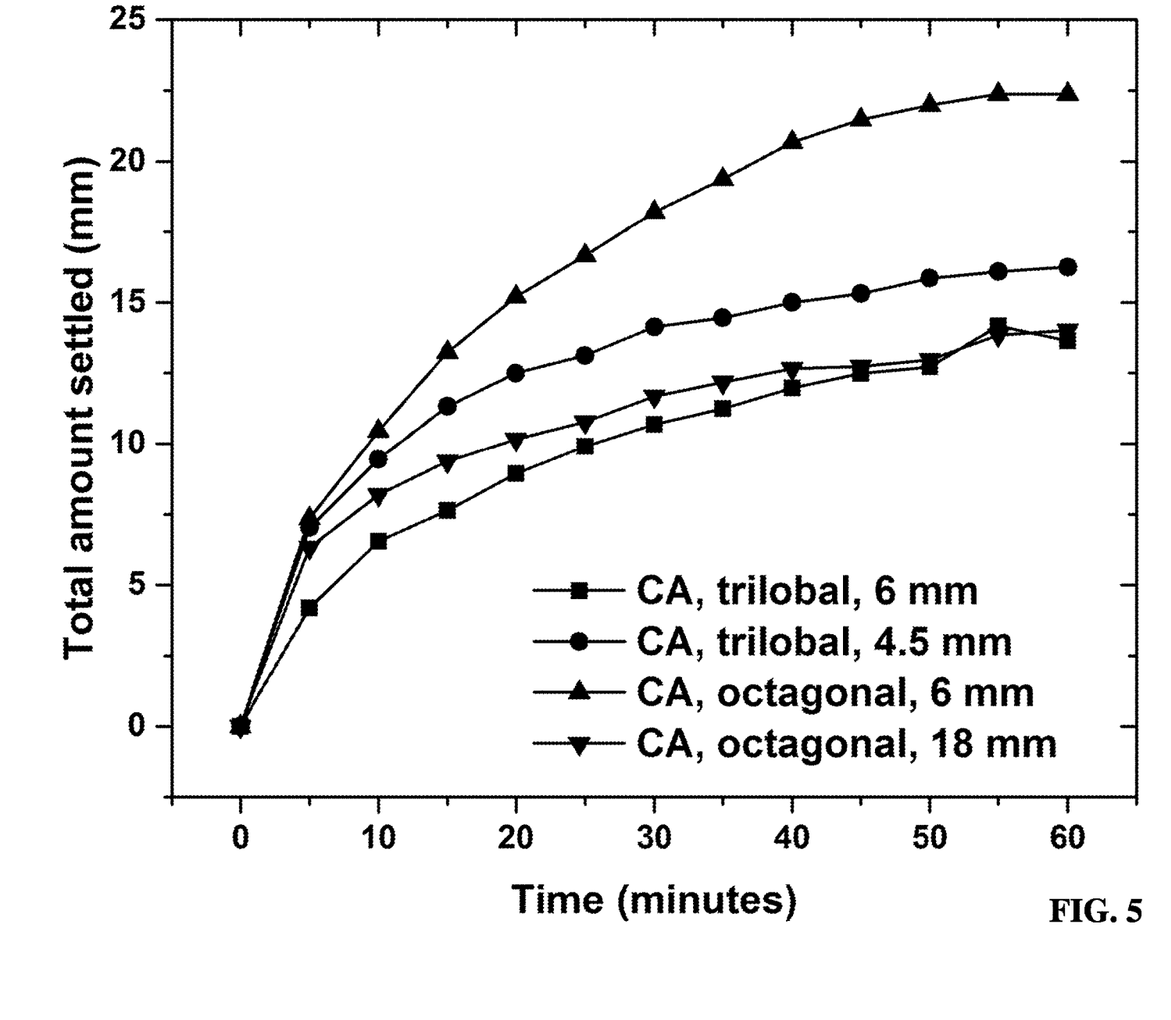
FIG. 5 is graph showing the proppant suspension capabilities of straight fibers.
Figure 6:
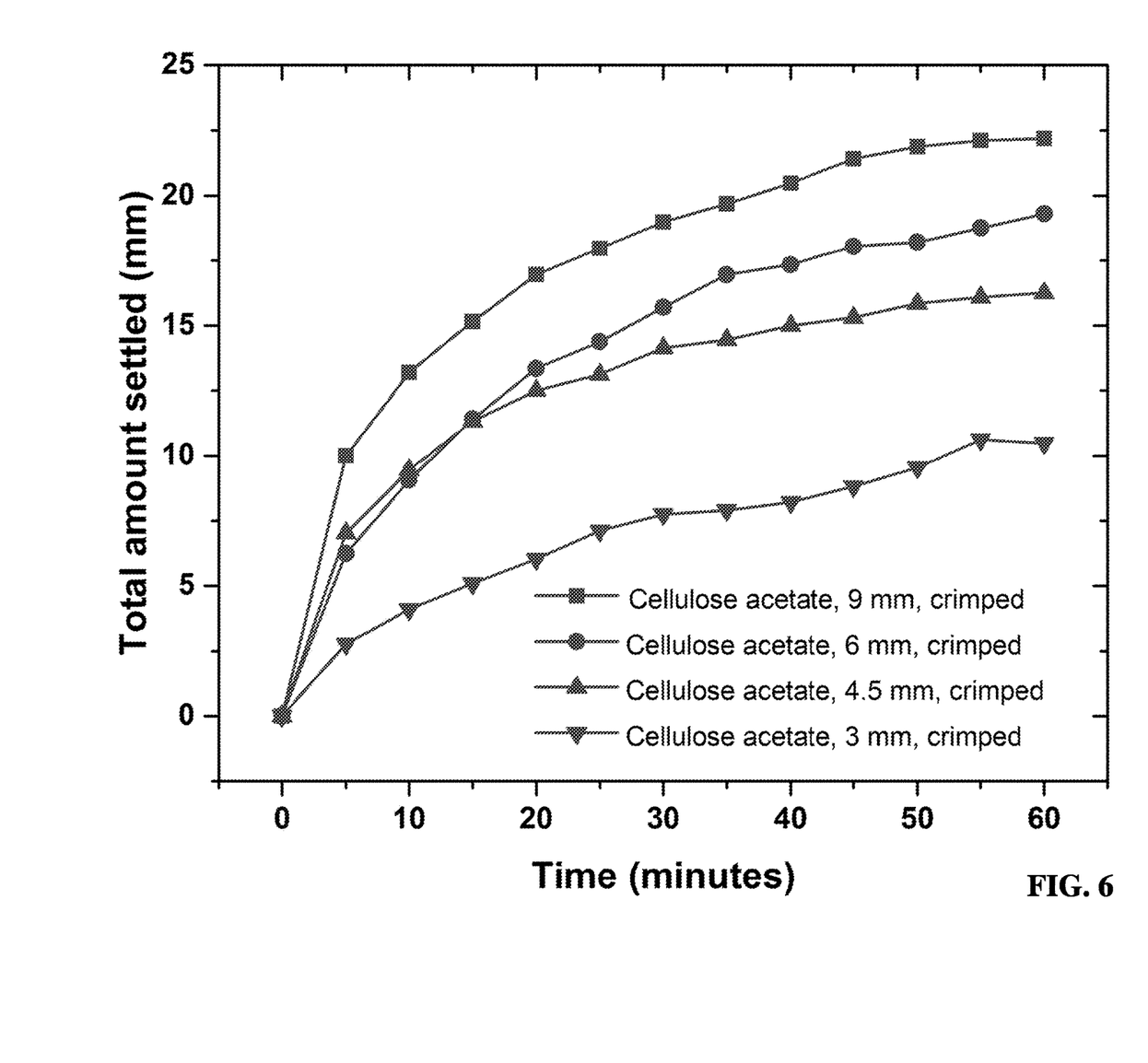
FIG. 6 is graph showing the proppant suspension capabilities of crimped fibers.

FIG. 5 shows the effects of the aspect ratio of uncrimped cellulose acetate fibers on the suspension of the proppant. FIG. 6 shows the effects of crimped cellulose acetate fibers on the suspension of the proppant.

Figure 7:
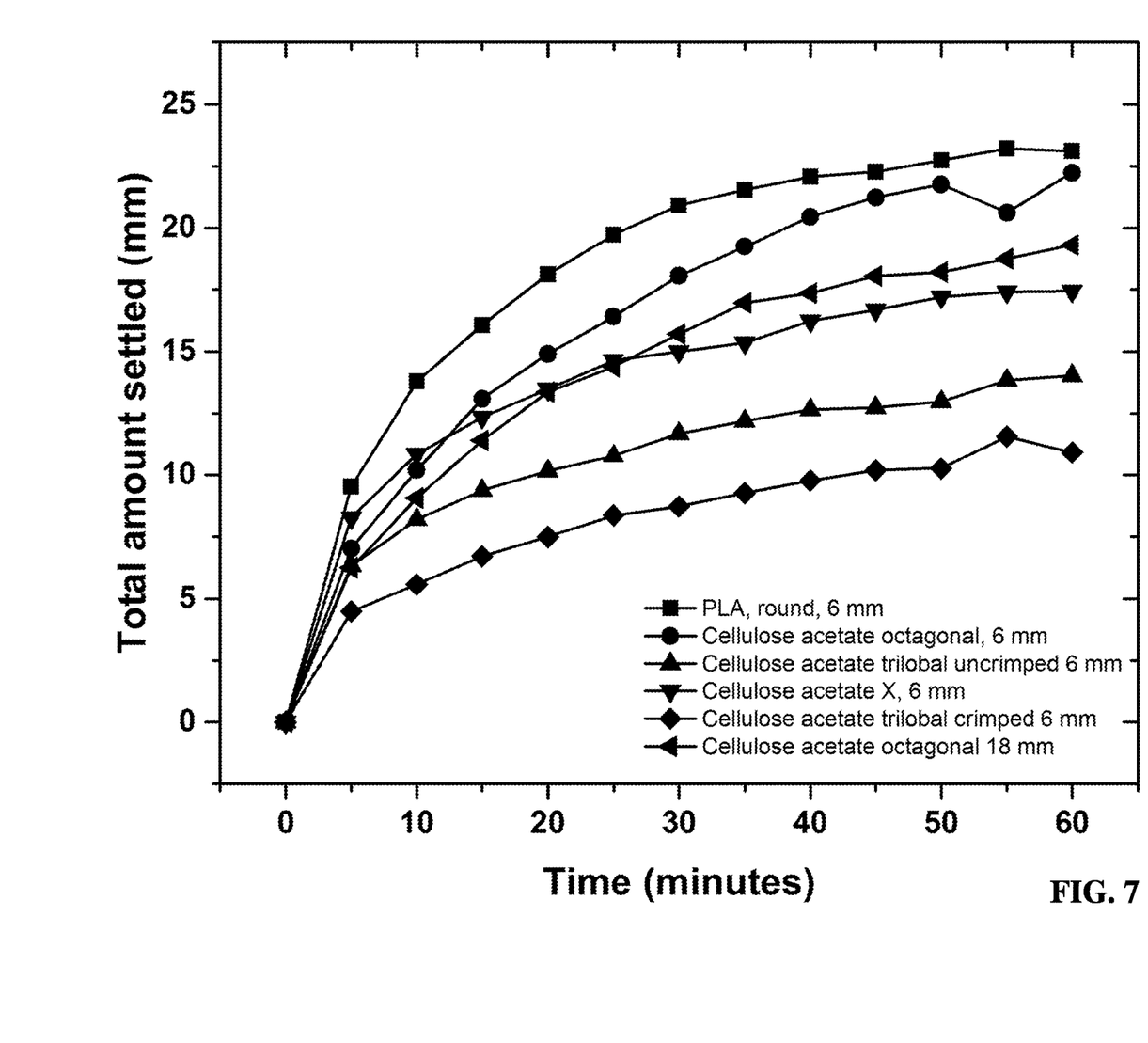
FIG. 7 is a graph comparing the proppant settling rates of cellulose ester fibers and PLA fibers.

To evaluate the effect of various variables on proppant settling, round polylactic acid (PLA) fibers were used as the basis for comparison due the current commercial use of PLA in the oilfield service industry. Comparison of proppant settling rates for cellulose ester fibers with various cross-sectional geometries and that of round PLA fibers is given in FIG. 7. As shown in FIG. 7, the use of PLA round fibers resulted in the largest settling rate.

According to FIG. 7, the best candidate for the suspension of proppant would have a low density, a medium length, a crimped configuration, and a trilobal cross-sectional geometry.

Interestingly, despite being comprised of different materials and possessing different DPF values, the PLA-round and CA-popcorn fibers showed similar settling behavior with an almost identical total amount settled after 60 minutes (22.7 vs. 22.4 mm) suggesting the settling behavior may be at least partially independent of the chemical nature of the fiber.

Figure 8:
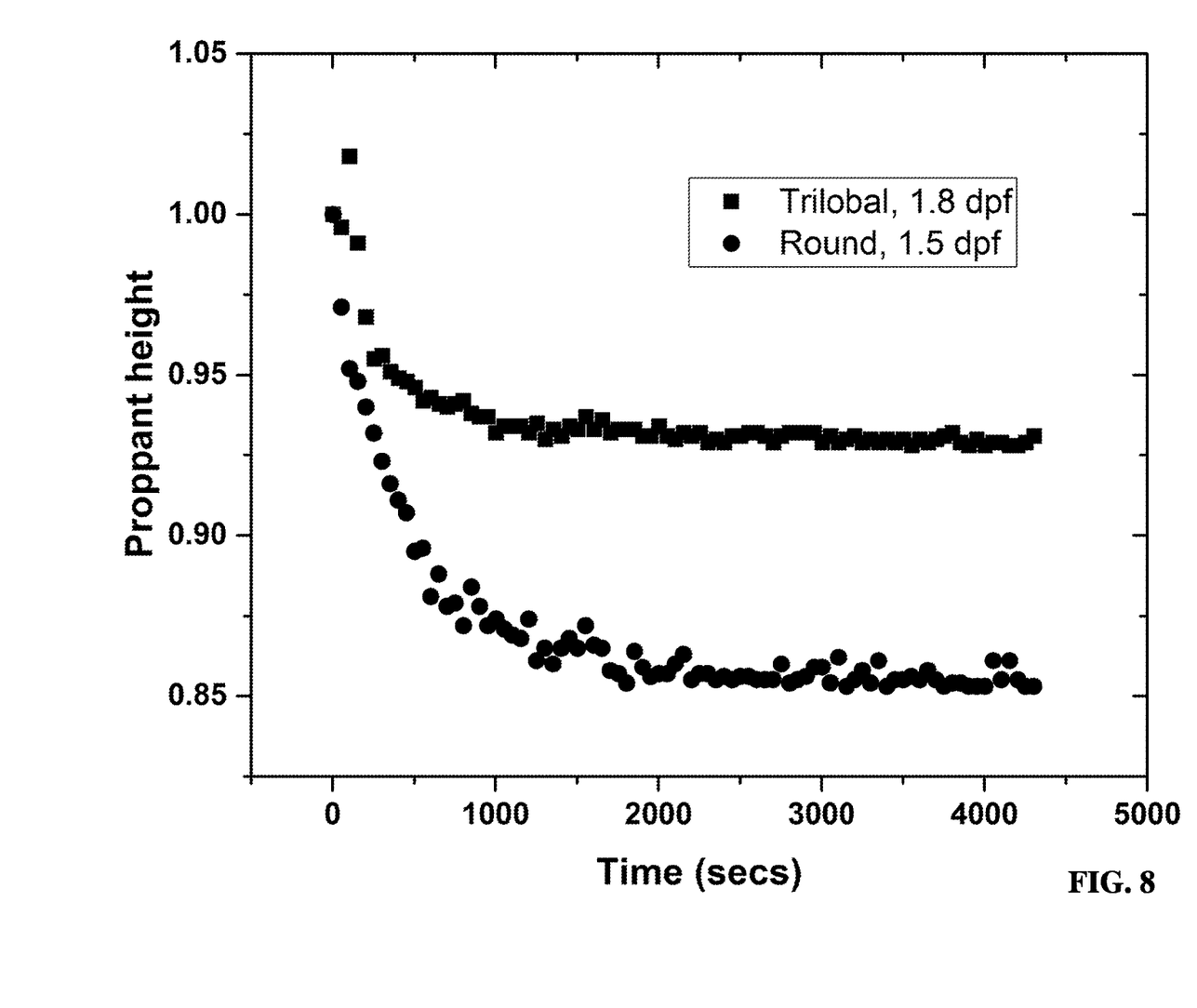
FIG. 8 is a graph showing settling performance of round and trilobal polylactic acid (PLA) fibers.
Figure 9:
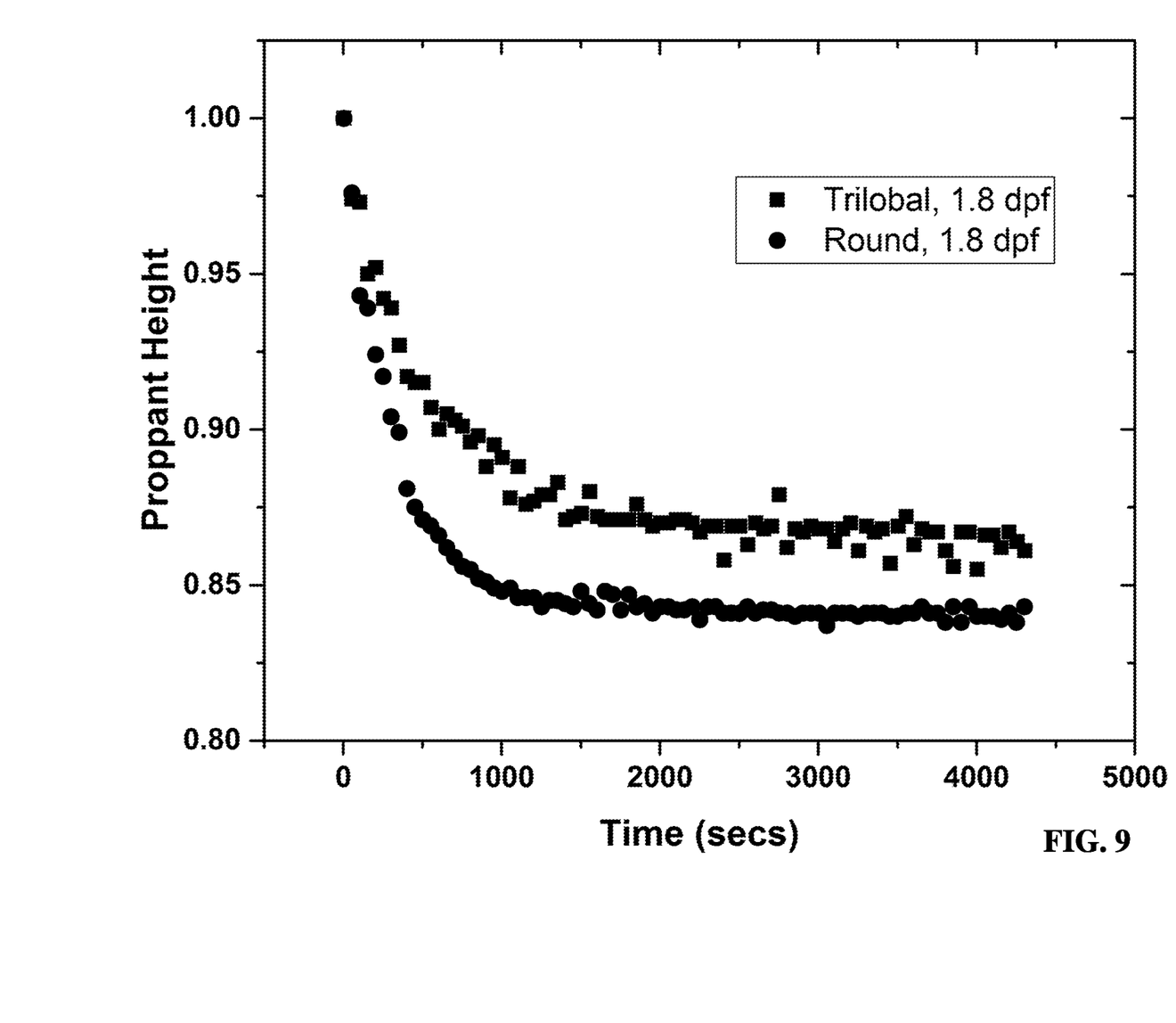
FIG. 9 is a graph showing settling performance for round and trilobal polyethylene terephthalate (PET) fibers.

FIGS. 8 and 9 show that for both PLA fibers (FIG. 8) and PET fibers (FIG. 9) a trilobal cross-section provides more resistance to proppant settlement over time than a round fiber cross-section. The data plotted in FIGS. 8 and 9 was obtained using two separate Basler machine vision cameras to acquire images of the proppant as it settled. Lights were mounted behind the samples to illuminate the boundary between the proppant beads and the guar mixture. LabVIEW® software was written to acquire images from the two cameras simultaneously.

Based on the above, the following conclusions can be drawn: (1) trilobal fibers showed superior settling performance of all the fiber geometries tested; (2) crimping the fibers provided slower settling rates compared to straight fibers; (3) increasing the aspect ratio of the fibers helped to slow the settling to a degree with longer fibers helping to prevent settling, but at the risk of entanglement; (4) reducing fiber DPF increased fiber volume fraction and lead to less settling (i.e., cost saving by using lower density fibers); and (5) the ideal fiber would have a low density, a medium length, and a trilobal cross-section.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

As used herein, the term "wellbore" refers to any type of well, including a producing well, a non-producing well, an injection well, a fluid disposal well, an experimental well, an exploratory deep well, and the like.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

Claims not Limited to Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A wellbore treatment composition comprising a carrier fluid, a proppant, and a plurality of trilobal fibers, wherein said trilobal fibers comprise less than 5 weight percent of polylactic acid, polyglycolic acid, polyvinyl alcohol, polystyrene, poly (methyl methacrylate), polyethylene terephthalate, polyethylene, or polypropylene.

2. The wellbore treatment composition of claim 1, wherein said trilobal fibers comprise a degradable cellulose ester.

3. The wellbore treatment composition of claim 1, wherein said cellulose ester comprises cellulose acetate, cellulose propionate, cellulose butyrate, cellulose acetate propionate, cellulose acetate phthalate, cellulose acetate butyrate, or a carboxylated cellulose ester.

4. The wellbore treatment composition of claim 1, wherein said trilobal fibers are crimped.

5. The wellbore treatment composition of claim 1, wherein said trilobal fibers exhibit an average fiber surface area to volume ratio in the range of 10 to 1,000 mmP$^{-1}$.

6. The wellbore treatment composition of claim 1, wherein said trilobal fibers have:
  (i) an average surface area in the range of 0.2 to 1.5 mmP$^2$;
  (ii) an average cross-sectional perimeter dimension in the range of 10 to 300 μm; and
  (iii) an average fiber surface area to volume ratio in the range of 100 to 750 mmP$^{-1}$.

\* \* \* \* \*